(12) United States Patent
Ebner et al.

(10) Patent No.: US 11,704,401 B2
(45) Date of Patent: *Jul. 18, 2023

(54) MULTI-FACTOR AUTHENTICATION VIA MIXED REALITY

(71) Applicant: Xerox Corporation, Norwalk, CT (US)

(72) Inventors: Fritz Francis Ebner, Pittsford, NY (US); Matthew Leigh Puccini, Carlsbad, CA (US); Aaron Zachary Borden, Pittsford, NY (US); Matthew David Levesque, Henrietta, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/649,658

(22) Filed: Feb. 1, 2022

(65) Prior Publication Data

US 2022/0156358 A1    May 19, 2022

Related U.S. Application Data

(63) Continuation of application No. 16/660,879, filed on Oct. 23, 2019, now Pat. No. 11,321,441.

(51) Int. Cl.
*G06F 21/35* (2013.01)
*G06F 21/40* (2013.01)
(Continued)

(52) U.S. Cl.
CPC .............. *G06F 21/40* (2013.01); *G06F 21/35* (2013.01); *G06T 19/006* (2013.01); *G06V 20/10* (2022.01);
(Continued)

(58) Field of Classification Search
None
See application file for complete search history.

(56) References Cited

U.S. PATENT DOCUMENTS 9,092,600 B2   7/2015 Scavezze et al.
10,691,785 B1  6/2020 Budnitz
(Continued)

OTHER PUBLICATIONS

"First biometric authentication solution for consumer augmented reality headsets", May 9, 2018.
(Continued)

*Primary Examiner* — Nelson S. Giddins
(74) *Attorney, Agent, or Firm* — Fox Rothschild LLP

(57) ABSTRACT

The disclosure relates to an authentication approach to grant access to a secure service on an electronic device. The authentication approach includes receiving, via an electronic device, a request to access the secure service. The authentication approach includes determining whether the electronic device is positioned at a location that corresponds to a virtual authentication lock. The authentication approach includes displaying, in response to determining the device is positioned at the location that corresponds to the virtual authentication lock, the virtual authentication lock on a display of the electronic device. The authentication approach includes receiving one or more interactions with the virtual authentication lock. The authentication approach includes determining whether the one or more interactions correspond to one or more authentication interactions related to the virtual authentication lock and granting, in response to the one or more interactions corresponding to the one or more authentication interactions, access to the secure service.

11 Claims, 7 Drawing Sheets

(51) Int. Cl.
*G06T 19/00* (2011.01)
*H04L 9/40* (2022.01)
*G06V 20/10* (2022.01)

(52) U.S. Cl.
CPC .... *H04L 63/0815* (2013.01); *H04L 2463/082* (2013.01)

(56) References Cited

U.S. PATENT DOCUMENTS

2018/0158053 A1* 6/2018 Adams ................ G06F 3/04886
2018/0159686 A1   6/2018 Ko
2021/0056187 A1* 2/2021 Taylor ................... G06F 21/36
2022/0012923 A1* 1/2022 Lebeck ................... G06F 3/14

OTHER PUBLICATIONS

De Guzman, Jaybie A. et al., "Security and Privacy Approaches in Mixed Reality: A Literature Survey", Jun. 26, 2018.

* cited by examiner

MULTI-FACTOR AUTHENTICATION VIA MIXED REALITY

CROSS-REFERENCE AND CLAIM OF PRIORITY

This patent application claims priority to U.S. patent application Ser. No. 16/660,879 filed Oct. 23, 2019, the entirety of which is incorporated herein by reference.

TECHNICAL FIELD

The present disclosure relates generally to multi-factor authentication, and more particularly, to methods and systems that use multi-factor authentication via mixed reality to authenticate a client device to a service.

BACKGROUND

Multi-factor authentication may use a combination of factors to identify a user and grant the user access to a secure service. These factors may include something the user knows, such as a username and password; something the user possesses, such as a verification code received at the user's phone number; and/or something inherent to the user, such as the user's fingerprints, voice, or facial features. If a user successfully presents two or more of these factors, the user completes the login procedure and is granted access to the secure service. However, multi-factor authentication, and in particular two-factor authentication, may be vulnerable to various attacks, such as phishing, brute force attacks, man-in-the-middle attacks, and the like.

SUMMARY

In one or more cases, the disclosed technology relates to an authentication method to grant access to a secure service on an electronic device. In one or more cases, the authentication method includes receiving, via an electronic device, a request to access a secure service. In one or more cases, the authentication method includes determining whether the electronic device is positioned at a location that corresponds to a virtual authentication lock. In one or more cases, the authentication method includes displaying, in response to determining the electronic device is positioned at the location that corresponds to the virtual authentication lock, the virtual authentication lock on a display of the electronic device. In one or more cases, the authentication method includes receiving one or more interactions with the virtual authentication lock. In one or more cases, the authentication method includes determining whether the one or more interactions correspond to one or more authentication interactions related to the virtual authentication lock. In one or more cases, the authentication method includes granting, in response to the one or more interactions corresponding to the one or more authentication interactions, access to the secure service.

In one or more cases, the disclosed technology relates to a computer program product for determining whether to grant access to a secure service of an electronic device. In one or more cases, the computer program product includes a non-transitory computer-readable storage medium having program instructions embodied therewith for determining whether to grant access to a secure service. In one or more cases, the program instructions are executable by one or more processors. In one or more cases, the program instructions include receiving a request, via an electronic device, a request to access the secure service. In one or more cases, the program instructions include determining whether the electronic device is positioned at a location that corresponds to a virtual authentication lock. In one or more cases, the program instructions include displaying, in response to determining the electronic device is positioned at the location that corresponds to the virtual authentication lock, the virtual authentication lock on a display of the electronic device. In one or more cases, the program instructions include receiving one or more interactions with the virtual authentication lock. In one or more cases, the program instructions include determining whether the one or more interactions correspond to one or more authentication interactions related to the virtual authentication lock. In one or more cases, the program instructions include granting, in response to the one or more interactions corresponding to the one or more authentication interactions, access to the secure service.

A variety of additional aspects will be set forth in the description that follows. The aspects can relate to individual features and to combinations of features. It is to be understood that both the foregoing general description and the following detailed description are exemplary and explanatory only and are not restrictive of the broad inventive concepts upon which the embodiments disclosed in the present disclosure are based.

BRIEF DESCRIPTION OF THE FIGURES

The following drawings are illustrative of particular embodiments of the present disclosure and therefore do not limit the scope of the present disclosure. The drawings are not to scale and are intended for use in conjunction with the explanations in the following detailed description.

DETAILED DESCRIPTION

Figure 1:
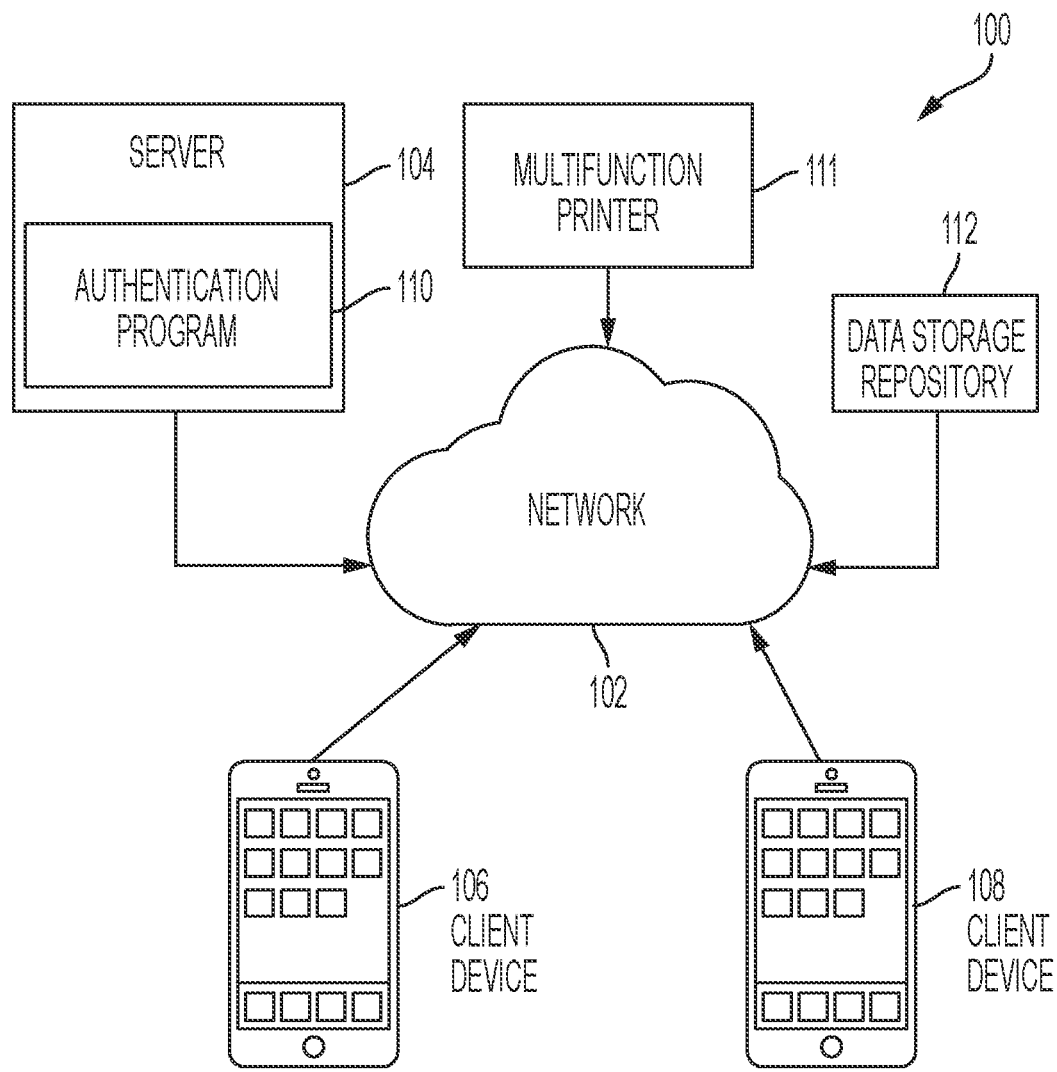
FIG. 1 is a functional block diagram illustrating a data processing environment.

In the following detailed description, numerous details are set forth in order to provide an understanding of the authentication program, however, it will be understood by those skilled in the art that different and numerous embodiments of the authentication program and the method of operation may be practiced without those specific details, and the claims and disclosure should not be limited to the embodiments, subassemblies, features, processes, methods, aspects, features or details specifically described and shown in the present disclosure. Further, particular features described in the present disclosure can be used in combination with other described features in each of the various possible combinations and permutations. Thus, the following more detailed description, as represented in the figures, is not intended to limit the scope of the present disclosure, but is merely representative of certain implementations in various different scenarios. While the various aspects are presented in the drawings, the drawings are not necessarily drawn to scale unless specifically indicated.

The following detailed description omits or only briefly describes conventional features of the data processing environment configured to operate the authentication program, which are apparent to those skilled in the art. Moreover, unless otherwise specifically defined in the present disclosure, all terms are to be given their broadest possible interpretation including meanings implied from the specification as well as meanings understood by those skilled in the art and/or as defined in dictionaries, treatises, etc. It must also be noted that, as used in the specification and the appended claims, the singular forms "a," "an" and "the" include plural referents unless otherwise specified, and that the terms "comprises" and/or "comprising," when used in this specification, specify the presence of stated features, steps, operations, elements, and/or components, but do not preclude the presence or addition of one or more other features, steps, operations, elements, components, and/or groups.

Embodiments disclosed in the present disclosure relate generally to multi-factor authentication, and more particularly, to multi-factor authentication via mixed reality. The embodiments are described below with reference to the Figures.

FIG. 1 is a functional block diagram illustrating a data processing environment 100. FIG. 1 provides only an illustration of one implementation and does not imply any limitations with regard to the environments in which different embodiments may be implemented. Many modifications to the depicted environment may be made by those skilled in the art without departing from the scope of the embodiments of the present disclosure. The data processing environment 100 includes a network 102, a server 104, which operates an authentication program 110, and one or more computing electronic devices, such as client devices 106 and 108.

The network 102 can be, for example, a local area network (LAN), a telecommunications network, a wide area network (WAN), such as the Internet, a virtual local area network (VLAN), a Bluetooth® network, or any combination that can include wired, wireless, or fiber optic connections. The network 102 can also include wire cables, wireless communication links, fiber optic cables, routers, switches and/or firewalls. The network 102 interconnects the server 104, the client device 106, and the client device 108. In general, the network 102 can be any combination of connections and protocols capable of supporting communications between the server 104, the client device 106, the client device 108, and the authentication program 110.

The server 104 is a web-based server hosting the authentication program 110. In one or more cases, the server 104 can be a web server, a blade server, a computer including one or more processors and at least one non-transitory computer readable memory, a mobile computing device, a laptop computer, a tablet computer, a netbook computer, a personal computer (PC), a desktop computer, or any programmable electronic device or computing system capable of receiving and sending data, via the network 102, and performing computer-readable program instructions. In one or more cases, the server 104 can be a data center, consisting of a collection of networks and servers providing an IT service, such as virtual servers and applications deployed on virtual servers, to an external party. In one or more cases, the server 104 represents a computing system utilizing clustered computers and components (e.g., database server computer, application server computers, etc.) that act as a single pool of seamless resources, such as in a cloud computing environment, when accessed within the data processing environment 100.

In one or more cases, the server 104 includes a data storage repository 112 for storing data including, but not limited to, registration information for a secure service, a location of a virtual authentication lock, one or more features of the location of the virtual authentication lock, and one or more security unlock interactions. The data storage repository 112 can be one of, a web server, a mobile computing device, a laptop computer, a tablet computer, a netbook computer, a personal computer (PC), a desktop computer, or any programmable electronic device or computing system capable of receiving, storing, and sending data, such as data related to the location of a virtual authentication lock, and performing computer readable program instructions capable of communicating with the server 104, the client device 106, and the client device 108, via the network 102. In one or more cases, the data storage repository 112 can represent virtual instances operating on a computing system utilizing clustered computers and components (e.g., database server computer, application server computers, etc.) that act as a single pool of seamless resources when accessed within the data processing environment 100.

In one or more cases, the authentication program 110 operates on a central server, such as the server 104, and may be utilized by one or more computing electronic devices, such as client devices 106 and 108, via an application downloaded from the central server or a third-party application store, and executed on the one or more computing electronic devices. In one or more cases, the authentication program 110 may be a software-based program, downloaded from a central server, such as the server 104, and installed on one or more computing electronic devices, such as client devices 106 and 108. In one or more cases, the authentication program 110 can be utilized as a software service provided by a third-party cloud service provider (not shown). In one or more cases, the authentication program 110 may be preinstalled, as software and/or firmware, on the one or more computing electronic devices. In one or more cases, the authentication program 110 may be installed onto the one or more computing electronic devices via an external storage device, such as a universal serial bus (USB) flash drive.

The authentication program 110 is configured to authenticate one or more factors to identify a user and grant access to a secure service. In one or more cases, a secure service may be an account for financial service, such as a bank account, an account for a data storage service, or other like services. In one or more other cases, the secure service may be a document processing service, such as a file storage site on which multiple digital files (documents, photos, other media, etc.) are stored. In addition, the secure service may include a multi-function printer 111, and the authentication program 110 may be used to determine whether to grant a user to one or more functions of the multi-function printer 111, such as printing, scanning, document retrieval and the like. In one or more cases, the secure service may be an application provided on the client device 106. For example, the authentication program 110 may be configured to authenticate one or more factors to allow a user to interact with the application, for example, opening the application, submitting a payment, or other like interactions with an application that may utilize an authentication process. In one or more cases, the secure service may be a lock screen of the client device 106. For example, the authentication program 110 may be configured to authenticate one or more factors, via the lock screen of the client device 106, to allow a user to access the client device 106.

In one or more cases, the client device 106 is an electronic computing device, such as a desktop computer, a laptop computer, a tablet computer, a personal digital assistant (PDA), a smart phone, a thin client, or any other electronic device or computing system capable of communicating with the server 104 through the network 102. The client device 106 may be a client to the server 104. The client device 106 can be configured with a camera or another type of imaging device suitable for acquiring images, such as, for example, images of one or more objects at a location of a virtual authentication lock. In other cases, the client device 106 can be any suitable types of mobile device capable of running mobile applications, including smart phones, tablets, slate, or any type of device that runs a mobile operating system. For example, the client device 106 may be a mobile device operated by a user and capable of connecting to a network, such as the network 102, to transmit one or more interactions with a virtual authentication lock, and/or one or more security codes to the authentication program 110. In yet other cases, the client device 106 can be any wearable electronic device, such as a head-mounted display, a smartwatch, or the like that is capable of sending, receiving, and processing data. For example, the client device 106 may be a pair of smartglasses capable of displaying a virtual authentication lock, such as a top hat virtual authentication lock 402 on a table 400, and allowing a user to interact with the virtual authentication lock, as discussed in the present disclosure.

In one or more cases, the client device 106 can include a user interface for providing an end user with the capability to interact with the authentication program 110. A user interface refers to the information (such as graphics, text, and sound) the authentication program 110 presents to a user and the control sequences the user employs to control the authentication program 110 and respond to prompts generated by the authentication program 110. A user interface can be, for example, a keyboard that allows a user to input text, a camera that can recognize user gestures and/or objects, a touchscreen that accepts input from a user via touch of a body part and/or a stylus, or the like. A user may access the authentication program 110 through the user interface to enable the authentication program 110 to operate on the user's device.

In one or more cases, the client device 108 includes one or more of the same or similar features as discussed with respect to the client device 106. Accordingly, a description of such features is not repeated.

Figure 2:
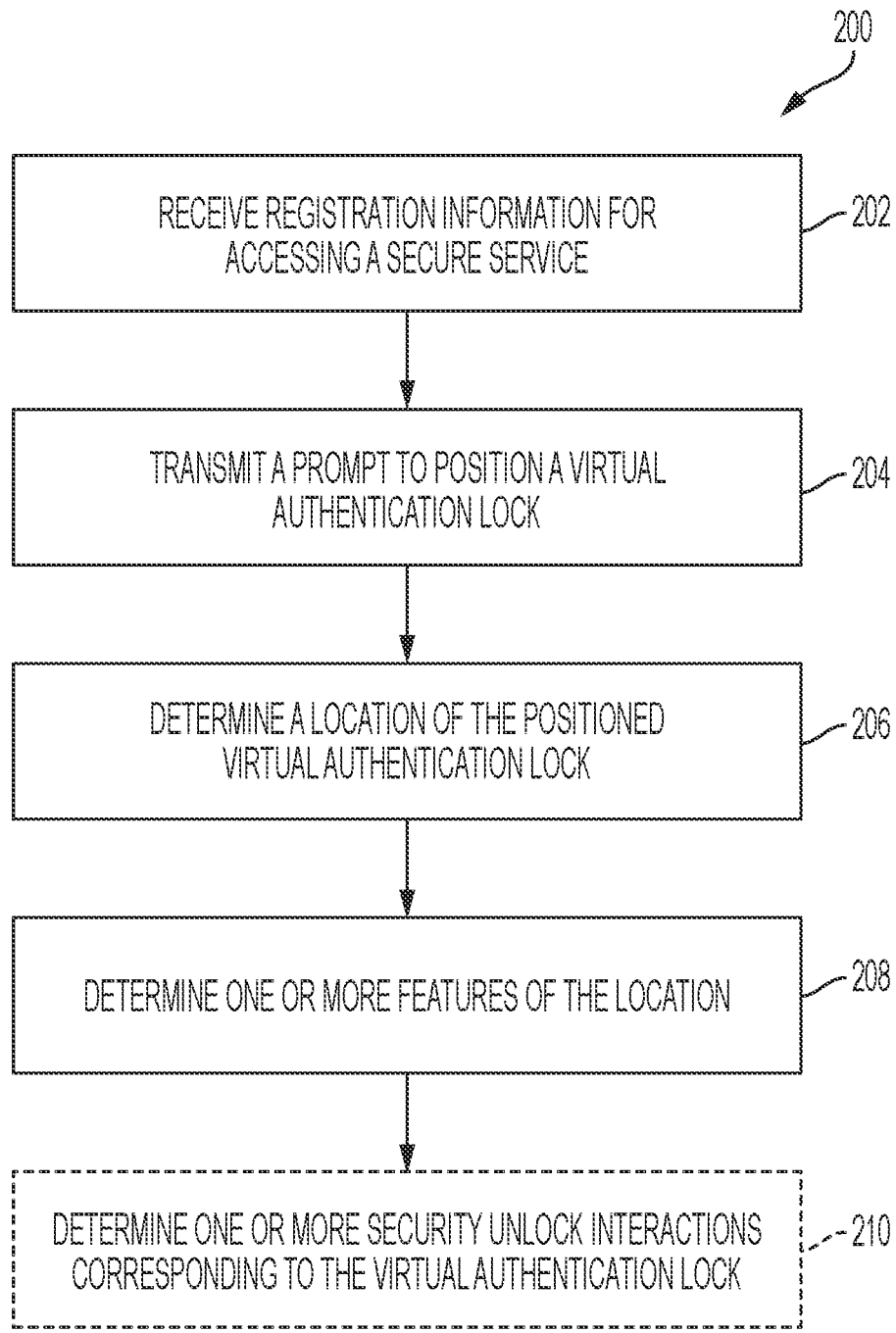
FIG. 2 is a flowchart that illustrates registering a virtual authentication lock.
Figure 4A:
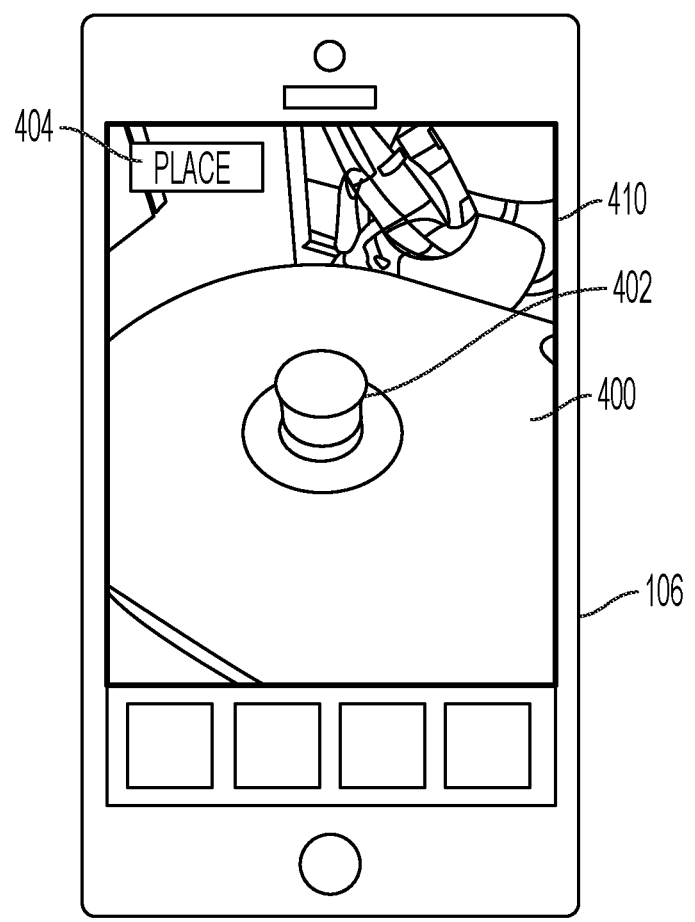
FIG. 4A illustrates an example of registering a virtual authentication lock.

FIG. 2 is a flowchart that illustrates operations, generally designated 200, of registering a virtual authentication lock. A virtual authentication lock is a software program on a computing electronic device, such as client device 106, which prevents a user from accessing a secure service until the identity of the user is authenticated. The virtual authentication lock may be a digital object within a mixed reality environment in which a user can interact with in real-time. The user may interact with the virtual authentication lock to authenticate the identity of the user. In one or more cases discussed in the present disclosure, computing electronic devices, such as the client device 106 and the client device 108, can initiate one or more operations of registering the virtual authentication lock via the authentication program 110 by connecting to the server 104 via the network 102. FIG. 4A illustrates an example of registering one or more virtual authentication locks.

In one or more cases, registration information for accessing a secure service is received (202), preferably by the authentication program 110. For example, a user may input registration information in the client device 106 to access the secure service, such as a banking service. Registration information is data that identifies the user. For example, the registration information may include information such as the user's name, address, login ID, password, and the like.

Figure 4B:
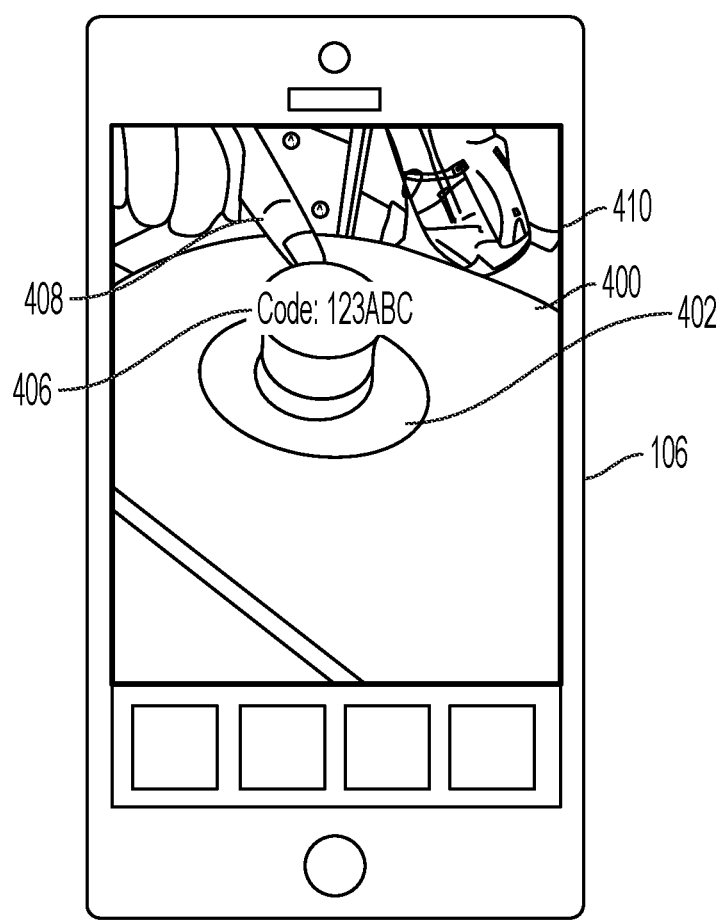
FIG. 4B illustrates unlocking the virtual authentication lock.

In one or more cases, registration information may also include a virtual authentication lock that the user selects to interact with when accessing the secure service. For example, the virtual authentication lock may be a top hat virtual authentication lock 402, as shown in FIG. 4A, in which a user presses down on top of the top hat virtual authentication lock 402 to receive a security code 406, as shown in FIG. 4B. In one or more other cases, the virtual authentication lock may be preset by default and/or based on the type of secure service. For instance, a banking service may include a preset virtual authentication lock that is more complex than a virtual authentication lock for a gaming application. In an example, another virtual authentication lock for the banking service may include a virtual dresser having several drawers, in which a user accesses the secure service by pulling out the correct drawer. However, a virtual authentication lock for a gaming application may include a virtual light switch, in which a user accesses the secure service by turning the light switch to an ON position. In one or more cases, the user may select the number of virtual authentication locks to interact with when accessing the secure service. For example, the authentication program 110 may present three virtual authentication locks to interact with to access the secure service. In one or more other cases, the number of virtual authentication locks used to access the secure service may be preset by default. In one or more cases, the user may set the registration information when initially accessing the secure service, after which the registration information may be saved in the data storage repository 112. In one or more cases, the virtual authentication lock may be used to authenticate a user and grant the user access to a print device, such as a printer.

In one or more cases, having selected the virtual authentication lock, a prompt is transmitted, preferably by the authentication program 110, to position the virtual authentication lock (204). The authentication program 110 may transmit the prompt to the client device 106, which displays the prompt and the virtual authentication lock to the user on the display screen of the client device 106. The prompt may indicate to the user to position the virtual authentication lock with a real world object displayed on the display screen of the client device 106. For example, the authentication program 110 may transmit a prompt 404, such as "PLACE" as shown in FIG. 4A, to the client device 106, which displays the prompt 404 on the display screen 410 of the client device 106. Having received the prompt 404, the client device 106 may display the virtual authentication lock 402 on the display screen 410 to be positioned by the user. The user may position the virtual authentication lock 402, such as the top hat virtual authentication lock, with a real world object, such as a table 400, by moving the top hat virtual authentication lock 402 over the table 400. The user may move the virtual authentication lock 402 with the user input, such as a finger or stylus, touching the display screen 410 and positioning the virtual authentication lock 402 on the display screen. For the cases in which a virtual authentication lock is used to authenticate a user to a print device, the virtual authentication lock may be manually positioned with the print device by the user.

In one or more other cases, the virtual authentication lock is displayed in a default location on the display screen. For example, the virtual authentication lock 402 may be shown on a corner area, a central area, an upper side, a lower side, a right side, or a left side of the display screen 410. For the cases in which a virtual authentication lock is used to authenticate a user to a print device, the virtual authentication lock may be shown near the print device. For example, the virtual authentication lock may be positioned at an area above the printer, and/or on a surface of the print device, for example, but not limited to, a top horizontal surface of the print device.

"Positioning" the virtual authentication lock in a location in the physical environment means determining a position in the environment that, when viewed on the display, will cause the system to show the virtual lock. For example, the "positioning" may include associating a set of coordinates with the virtual authentication lock so that when the display shows the location of those coordinates, the authentication program 110 will show the virtual authentication lock. Alternatively, "positioning" may include determining a location with respect to a point or item of reference such as a print device, so that when the point or item is displayed, the virtual authentication lock will be displayed.

In yet one or more other cases, the authentication program 110 analyzes the real world objects displayed on the display screen of the client device 106 and associates the one or more virtual authentication locks with the one or more real world objects. For example, the authentication program 110 may determine a real world object, such as the table 400, is displayed on the display screen 410, and anchors the virtual authentication lock, such as the top hat virtual authentication lock 402, to the real world object. The authentication program 110 may utilize one or more classification algorithms to determine the real world object. For instance, the authentication program 110 may utilize deep learning neural networks, such as but not limited to, Faster R-CNN, YOLO, and SSD, that have been trained to detect numerous classes of objects. For example, the authentication program 110 may utilize one or more deep learning neural networks to determine that the real world object is a table 400. In another example, the authentication program 110 may utilize the one or more deep learning neural networks to detect bounding boxes of real world objects, such as print devices, in one or more images. For the cases in which a virtual authentication lock is used to authenticate a print device, the authentication program 110 may determine, via one or more classification algorithms, that a real world object, such as the print device, is displayed on the display screen 410, and anchors the virtual authentication lock to the print device. In one or more cases, the virtual authentication lock may be shown on the display screen 410 near the print device, for example, but not limited to, an area above the printer, and/or on a surface of the print device, for example, but not limited to, a top horizontal surface of the print device.

After a virtual authentication lock has been positioned with a real world object, a location of the positioned virtual authentication lock is determined (206), preferably by the authentication program 110. The authentication program 110 may determine the location of the positioned virtual authentication lock based at least in part on the location of the client device 106. The authentication program 110 may determine the location of the client device 106 using a geolocation technique and/or an indoor positioning technique. For example, the authentication program 110 may determine, via a geolocation technique, the location of the client device 106 by determining the GPS coordinates of the client device 106. In another example, the authentication program 110 may determine, via an indoor positioning technique, the location of the client device 106 by locating anchor nodes, such as WiFi access points and/or Bluetooth beacons, within a building that are used by the client device 106. The authentication program 110 may use the anchor nodes to track the relative position (for example, a position in a horizontal direction (x) and a position in vertical direction (y)) of the client device 106, in particular, the camera of the client device 106. In yet another example, the authentication program 110 may determine, via a geolocation technique and an indoor positioning technique, the location of the client device 106 by determining the GPS coordinates of the client device 106 and using anchor nodes within the building. For instance, the authentication program 110 may determine that the client device 106 is located at 800 Phillips Rd, Webster, N.Y. 14580, based on the GPS coordinates, and is located in room number 116 within building A, based on the location of the anchor nodes of the indoor positioning system.

Having determined the location of the client device 106, the client device 106 and/or the authentication program 110 may determine the location of the positioned virtual authentication lock. For instance, based on the location, such as the relative position, of the client device 106, the authentication program 110 may determine the distance from the client device 106 to a real world object, such as a table 400, within the field of view of the camera of the client device 106. The relative position of the client device 106 and distance from the client device 106 to the real world object within the field of view of the client device 106 may be used to determine the relative position of the real world object, which corresponds to a location of the virtual authentication lock. In one or more cases, the client device 106 may perform location calculations to determine the relative position of the real-world object. The relative position of the real world object, i.e., the location of the virtual authentication lock, may be a location in world map coordinates within a world coordinate system (WCS). By utilizing world map coordinates, a user can view the virtual authentication lock from multiple points of view on the display of the client device 106. In one or more other cases, the authentication program 110 may send location information, such as the relative position of the client device 106 and the distance to the real world object, from the client device 106 to the server 104. Having received the location information, the server 104 performs the location calculations to determine the location of the real world object, and transmits the location calculations to the client device 106. The authentication program 110 may use the location of the client device 106 and the distance to the real world object to determine the location of the positioned virtual authentication lock. In addition to being a location in world map coordinates, the location of the positioned virtual authentication lock may be a position (for example, a position in a horizontal direction (x) and a position in vertical direction (y)) relative to the position of the real world object. In one or more other cases, the location of the virtual authentication lock may be a position (for example, a position in a horizontal direction (x) and a position in vertical direction (y)) relative to the position of the real world object.

Once the location of the positioned virtual authentication lock is determined, the system will determine one or more features of the location (208), preferably by the authentication program 110. The one or more features may be either the real world object or other real world objects that will otherwise serve as a reference point to identify where the virtual authentication lock is positioned in the real world environment. The authentication program 110 may use the one or more features of the location to determine when to display the virtual authentication lock on the display of the client device 106. The user may capture images of the one or more features using a camera of the client device 106. The authentication program 110 may use the camera of the client device 106 to analyze, via image processing, the one or more features in the field of view of the camera of the client device 106 using any suitable image processing technique and store the one or more features (e.g., the real world object) in a memory.

The authentication program 110 may utilize one or more classification algorithms to determine the one or more features within the field of view of the camera. For instance, the authentication program 110 may utilize deep learning neural networks, such as but not limited to, Faster R-CNN, YOLO, and SSD, that have been trained to detect numerous classes of objects. For example, the authentication program 110 may utilize one or more deep learning neural networks to determine that the real world object is a table 400. In another example, the authentication program 110 may utilize the one or more deep learning neural networks to detect bounding boxes of real world objects, such as print devices, in one or more images. The authentication program 110 may extract and analyze image data from the captured images of the one or more features. For example, the camera of the client device 106 may capture an image of the table 400 in room 116, and the authentication program 110 may analyze the image data of the captured image, and determine that the real world object is, in this example, the table 400. The authentication program 110 may determine that the real world object is a feature of the location, in this example room 116, of the positioned virtual authentication lock. Alternatively, or in addition to processing image data, the system may use data from the client device's accelerometer, gyroscope, inertial measurement unit and/or other position sensors determine the position and/or orientation of the client device 106. The system may store a range of client device 106 positions and orientations (e.g., the pose of the client device 106 camera, which may include the position and heading of the camera) for the location of the positioned virtual authentication lock and store data indicating that that the real world object (or other reference location) is on the display (and thus the virtual authentication lock should be shown) if the client device's position and orientation are within the stored ranges.

Having determined the one or more features of the location that will be used to determine when to display the virtual authentication lock, the authentication program 110 may associate the one or more features of the location of the positioned virtual authentication lock to the positioned virtual authentication lock. For example, the authentication program 110 may associate the table 400 located in room 116 with the top hat virtual authentication lock 402. The authentication program 110 may store the image data related to the feature, the association between the one or more features and the location, and/or the association between the one or more features and the virtual authentication lock in a database, such as a lookup table. The authentication program 110 may subsequently reference the database to authenticate a user as describe in the present disclosure. For example, for the cases in which the authentication program 110 determines that the client device 106 is located in room 116, the authentication program 110 may retrieve the associated feature, i.e., the table 400, from the database to determine whether the camera of the client device 106 is capturing the table 400. The database may be stored in the data storage repository 112.

In one or more cases, one or more security unlock interactions corresponding to the positioned virtual authentication lock is optionally determined (210), preferably by the authentication program 110. The authentication program 110 may provide the user with an option of how to unlock the virtual authentication lock. For example, the authentication program 110 may transmit a prompt to set an unlock interaction to the client device 106, which displays the prompt on a display screen 410 of the client device 106. The user may interact with the positioned virtual authentication lock by performing one or more gestures with the virtual authentication lock. For example, the user may press down on the top of the top hat virtual authentication lock 402. The authentication program 110 may register the gesture as a security unlock interaction for the top hat virtual authentication lock 402. In one or more cases, the authentication program 110 may store the one or more security unlock interactions corresponding to the virtual authentication lock in database, such as a lookup table. The authentication program 110 may subsequently reference the database to authenticate a user as describe in the present disclosure. The database may be stored in the data storage repository 112.

Figure 3A:
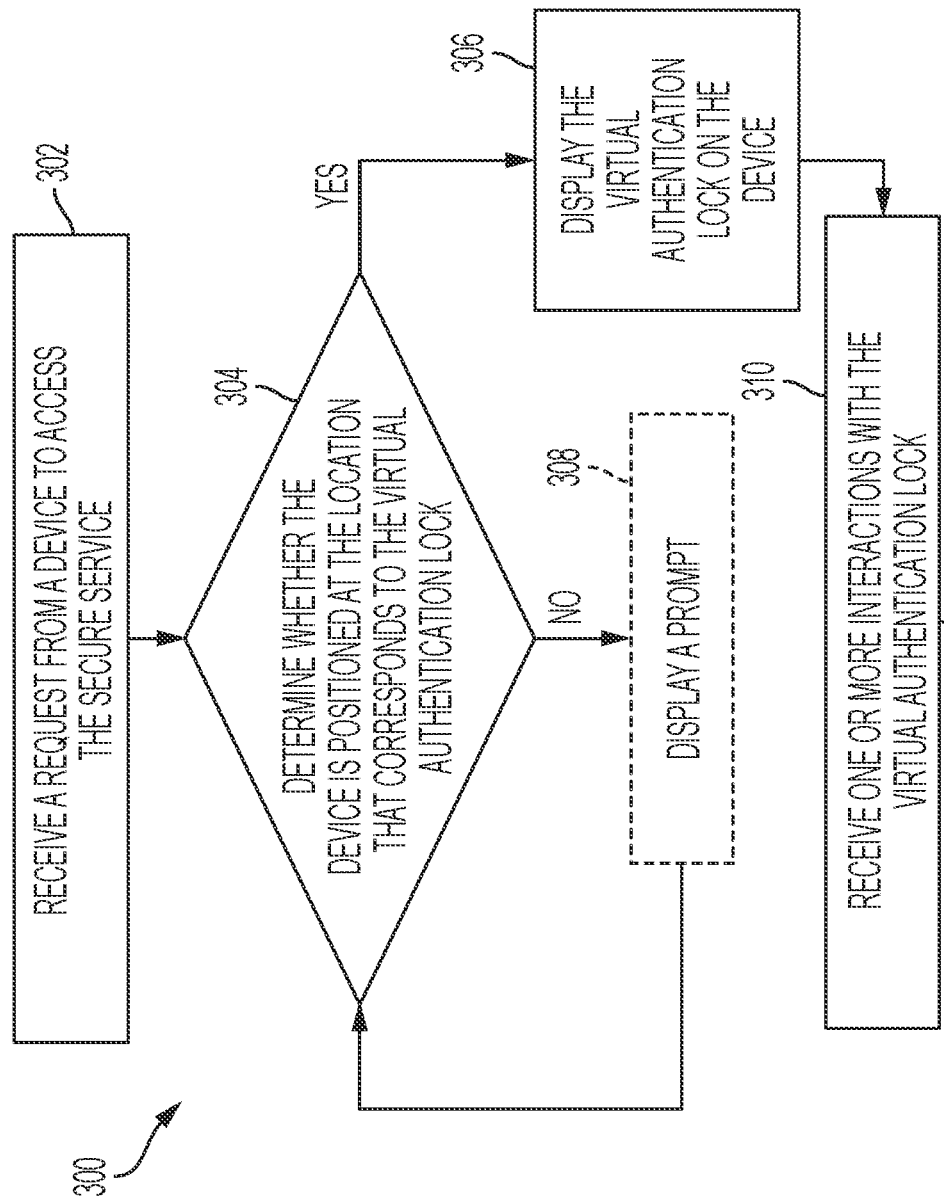
FIGS. 3A and 3B are flowcharts that illustrate accessing a secure service, via unlocking the virtual authentication lock.
Figure 3B:
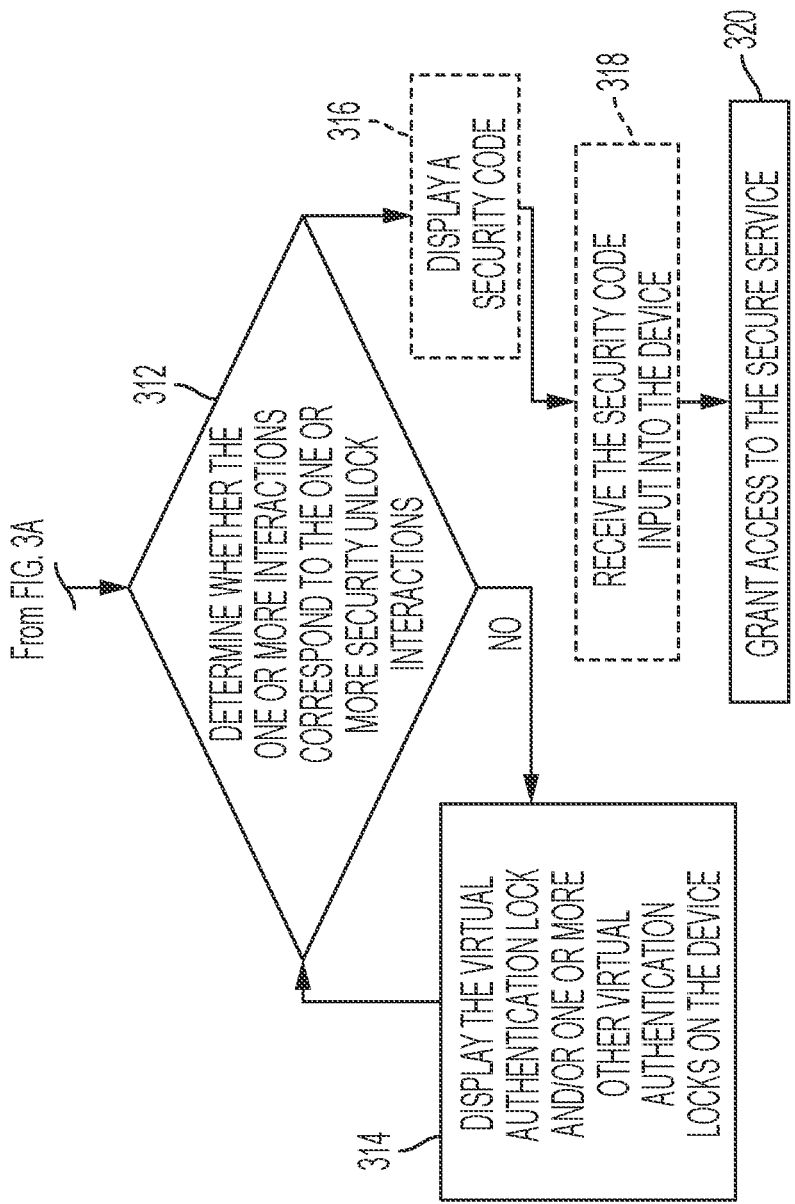

FIGS. 3A and 3B are flowcharts that illustrate operations, generally designated 300, of accessing a secure service, via unlocking the virtual authentication lock. The operations illustrated in the flowchart may be used to authenticate a user. FIG. 4B illustrates an example of unlocking the virtual authentication lock.

In one or more cases, a request from the client device 106 to access the secure service is received (302), preferably by the authentication program 110. The user may select the application hosting the secure service. For example, the user may select the application on the client device 106, in which the application hosts a banking service. The authentication program 110 may receive the request, via the client device 106, to access the banking service. In one or more cases, the authentication program 110 may transmit a prompt to the client device 106, which displays the prompt indicating that the user bring the client device 106 to the location of the virtual authentication lock. The prompt may have one or more similar features as prompt 404. Accordingly, a discussion of such features is not repeated.

In one or more cases, a determination is made (304), preferably by the authentication program 110, as to whether the device is positioned at the location that corresponds to the virtual authentication lock. In one or more cases, the authentication program 110 may retrieve the location of the client device 106 via a geolocation technique and/or an indoor positioning technique, as discussed in the present disclosure. For example, the authentication program 110 may retrieve the GPS coordinates of the client device 106 and/or the location of the anchoring nodes nearest to the client device 106. The authentication program 110 may retrieve the location of the client device 106 periodically to determine whether the location of the client device 106 is positioned at the location that corresponds to the virtual authentication lock. In one or more other cases, the client device 106 may retrieve the location of the client device 106, via a geolocation technique and/or an indoor positioning technique. The client device 106 may transmit the location of the client device 106 to the authentication program 110. For example, once the user brings the client device 106 to the location of the one or more virtual authentication locks, the user may select a button displayed on the display screen indicating that the client device 106 is positioned at the location of the virtual authentication lock. By pressing the button, the client device 106 transmits the location of the client device 106 to the authentication program 110. Having determined the location of the client device 106, the client device 106 and/or the authentication program 110 may determine the location of the positioned virtual authentication lock, as discussed in the present disclosure. For example, based on the location, such as the relative position, of the client device 106, the authentication program 110 may determine the distance from the client device 106 to a real world object, such as the table 400, within the field of view of the camera of the client device 106. By correlating the location of the client device 106 and the distance from the client device 106 to the real world object within the field of view of the client device 106, the authentication program 110 determines whether the client device 106 is positioned at the location that corresponds to the location of the virtual authentication lock. In another example, based on the location of the client device 106, the authentication program 110 may determine the position of a real world object within the field of view of the client device 106, via hit testing. The authentication program 110 may determine whether the pose of the camera and the hit test vector match the location in world map coordinates of the positioned virtual authentication lock.

For the cases in which it is determined that the client device 106 is not positioned at the location that corresponds to the virtual authentication lock (304: NO), a prompt is optionally displayed (308), preferably by the client device 106, on the display screen 410 of the client device 106. For example, the authentication program 110 may determine that the location of the client device 106 is 800 Phillips Rd, Webster, N.Y. 14580, based on the GPS coordinates, and is located in room number 205 within building A, via the indoor positioning technique. The authentication program 110 may determine that the client device 106 is positioned within a room different than the room of the virtual authentication lock, for example, room number 116. Having determined that the client device 106 is not positioned at the location of the virtual authentication lock, the authentication program 110 transmits a prompt to the client device 106, which displays the prompt on the display screen 410. In one or more cases, the prompt may indicate to the user to bring the client device 106 to the location of the virtual authentication lock. In one or more other cases, the prompt may indicate that the client device 106 is not positioned at the location of the virtual authentication lock. The prompt may have one or more similar features as prompt 404. Accordingly, a discussion of such features is not repeated. In yet one or more other examples, the authentication program 110 may not transmit a prompt to the client device 106, in which case the client device 106 does not indicate to a user whether the client device 106 is in the location of the virtual authentication lock. Rather, the authentication program 110 displays the virtual authentication lock when the authentication program 110 determines that the location of the client device 106 is positioned at the location that corresponds to the location of the virtual authentication lock.

In one or more cases in which it is determined that the client device 106 is positioned at the location that corresponds to the virtual authentication lock (304: YES), the virtual authentication lock is displayed on the client device 106 (306). In one or more cases, the client device 106 may display the virtual authentication lock, such as the top hat virtual authentication lock 402, on the display screen 410 of the client device 106. For example, the authentication program 110 may determine that the location of the client device 106 is 800 Phillips Rd, Webster, N.Y. 14580, based on the GPS coordinates, and is located in room number 116 within building A. The authentication program 110 may determine that the client device 106 is positioned within the same room, for example, room number 116, as the top hat virtual authentication lock 402. Having determined the location of the client device 106, the client device 106 and/or the authentication program 110 may determine the location of the positioned virtual authentication lock, as discussed in the present disclosure. For instance, based on the location, such as the relative position, of the client device 106, the authentication program 110 may determine the distance from the client device 106 to the table 400 within the field of view of the camera of the client device 106. The authentication program 110 may correlate the location of the client device 106 and the distance from the client device 106 to the table 400 within the field of view of the client device 106 to determine whether the client device 106 is positioned at the location that corresponds to the location of the virtual authentication lock. Having determined that the client device 106 is positioned at the location that corresponds to the top hat virtual authentication lock 402, the authentication program 110 may transmit an instruction to display the top hat virtual authentication lock 402 on the table 400 within room 116. The client device 106 is configured to display the top hat virtual authentication lock 402 on the display screen 410 of the client device 106.

In one or more other cases in which determined that the client device 106 is positioned at the location that corresponds to the virtual authentication lock (304: YES), the authentication program 110 may use the camera of the client device 106 to analyze one or more features of the location to determine the location of the positioned virtual authentication lock in the environment and whether to display the virtual authentication lock on the display. In one or more cases, the authentication program 110 may analyze the one or more features of the location within the field of view of the camera of the client device 106 using image processing as described above. For example, the user may point the camera of the client device 106 at the table 400, and capture one or more images of the table 400 and surrounding features. The authentication program 110 may extract and analyze the image data of the one or more images, utilizing deep learning neural networks, to determine whether the stored one or more features, e.g., the table 400, appear on the display. In one or more cases, in addition to analyzing the image data of the one or more features within the location using image processing, the authentication program 110 may analyze data from the client device's accelerometer, gyroscope, inertial measurement unit and/or other sensors determine whether the position and/or orientation of the client device 106 are within the ranges at which the features (e.g., real world objects or reference points) are appearing in the display because the user points the camera of the client device 106 at those features. In one or more cases, the authentication program 110 may analyze the one or more features that are displayed on the display screen 410 of the client device 106, thereby allowing the user to pan the camera of the client device 106 around the room. In one or more other cases, the authentication program 110 may require that the user point the camera of the client device 106 at the targeted feature, e.g., the table 400, for a predetermined time period, e.g., three seconds, thereby inhibiting an unauthorized user from displaying the virtual authentication lock merely by panning the camera of the device 106 around the location.

In one or more cases, having captured the image data of the one or more features, the authentication program 110 may determine whether a feature within a location corresponds to a virtual authentication lock by looking up the feature in the lookup table. The lookup table may include image data related to the feature, the association between the one or more features and the location, and/or the association between the one or more features and the virtual authentication lock. For example, for the cases in which the authentication program 110 determines that the client device 106 is located in room 116, the authentication program 110 may look up the location in the lookup table and determine that the table 400 is a feature associated with room 116. The authentication program 110 may determine, via the lookup table, that the table 400 within room 116 is a feature corresponding to the top hat virtual authentication lock 402. Having determined the one or more features of the location that correspond to the virtual authentication lock, the virtual authentication lock is displayed on the device (306), as discussed in the present disclosure.

In one or more cases, one or more interactions with the virtual authentication lock is received (310), preferably by the authentication program 110. A user may interact with the virtual authentication lock by performing a gesture, using a body part of the user or a stylus, on the display screen 410. For example, the user may touch the top hat virtual authentication lock 402 with the user's finger 408. In some examples, the user may touch a portion of the top hat virtual authentication lock 402. In some other examples, the user may press down on the top of the top hat virtual authentication lock 402. In yet other examples, the user may slide the top hat virtual authentication lock 402 off of the table 400.

Having received one or more interactions with the virtual authentication lock, a determination is made as to whether the one or more interactions correspond to the one or more security unlock interactions (312), preferably by the authentication program 110. In one or more cases, the authentication program 110 compares the one or more interactions with the security unlock interaction. To compare the one or more interactions, the authentication program 110 retrieves the gesture of the security unlock interaction corresponding to the virtual authentication lock. In one or more cases, the authentication program 110 may retrieve the gesture from the lookup table stored in the data storage repository 112. The authentication program 110 may determine, for example, that the received interaction with the top hat virtual authentication lock 402 indicates that the user slid the top hat virtual authentication lock 402 off of the table 400. The authentication program 110 may determine that the interaction of sliding the top hat virtual authentication lock 402 off of the table 400 does not correspond to the gesture of the security unlock interaction. In another example, the authentication program 110 may determine that the received interaction with the top hat virtual authentication lock 402 indicates that the user pressed down on the top of the top hat virtual authentication lock 402. The authentication program 110 may determine that the interaction of pressing down the top of the top hat virtual authentication lock 402 corresponds to the gesture of the security unlock interaction.

For the cases in which the one or more interactions do not correspond to the one or more security unlock interactions (312: NO), the virtual authentication lock and/or one or more other virtual authentication locks are displayed on the device (314). In one or more cases, the client device 106 may display the one or more virtual authentication locks, such as the virtual authentication lock 402, on the display screen 410 of the client device 106. That is, the client device 106 may maintain displaying the virtual authentication lock 402 on the display screen 410, thereby allowing the user to input another interaction with the same virtual authentication lock to attempt to access the secure service. In one or more other cases, the client device 106 may remove the virtual authentication lock 402 from the display screen 410, and may display one or more other virtual authentication locks on the display screen 410 of the client device 106, thereby allowing the user to attempt to access the secure service by interacting with one or more other virtual authentication locks. In yet one or more other cases, the client device 106 may maintain displaying the virtual authentication lock 402 on the display screen 410 and may display one or more other virtual authentication locks on the display screen 410.

For the cases in which the one or more interactions corresponds to the one or more security unlock interactions (312: YES), a security code is optionally displayed (316), preferably by the client device 106. In one or more cases, the authentication program 110 may determine that the interaction corresponds to a security unlock interaction, for example pressing down the top of the top hat virtual authentication lock 402. Having determined the authentication program 110 may determine that the interaction corresponds to a security unlock interaction, the authentication program 110 transmits a security code 406 to the client device 106. The client device 106 may display the security code 406, for example "123ABC", on the display screen 410 of the client device 106. In one or more cases, the client device 106 may display a keyboard on the display screen 410, and the user may type the security code 406. In one or more other cases, the client device 106 may display an icon for a user to select and record the user speaking the security code 406. Having selected the recording icon, the user may speak the security code 406 to verbally input the security code 406 into the client device 106.

In one or more cases, the security code input into the device is received (318), preferably by the authentication program 110. The client device 106 may transmit the security code 406, which was input into the device 106, to the authentication program 110. Having received the security code 406, the authentication program 110 verifies whether the received code matches the security code displayed on the display screen 410. For the cases in which the received code does not match the displayed security code 406, the authentication program 110 may transmits a new security code to be displayed on the display screen 410 and verified. For the cases in which the received code matches the displayed security code 406, access to the secure service is granted (320), preferably by the authentication program 110. The authentication program 110 may authenticate the user and grant access to the secure service, thereby allowing the user to utilize one or more services of the secure service that were secured by the authentication program 110. For example, for the cases in which the secure service is a banking service, the user may view funds within the banking service account, and/or the user may transfer and/or withdraw funds from the banking service account.

For the cases in which the one or more interactions corresponds to the one or more security unlock interactions (312: YES), access to the secure service is granted (320), preferably by the authentication program 110. That is, in the alternative to authenticating a user and granting access by verifying a security code, the authentication program 110 may authenticate a user and grant access to the secure service when the one or more interactions corresponds to the one or more security unlock interactions.

Figure 5:
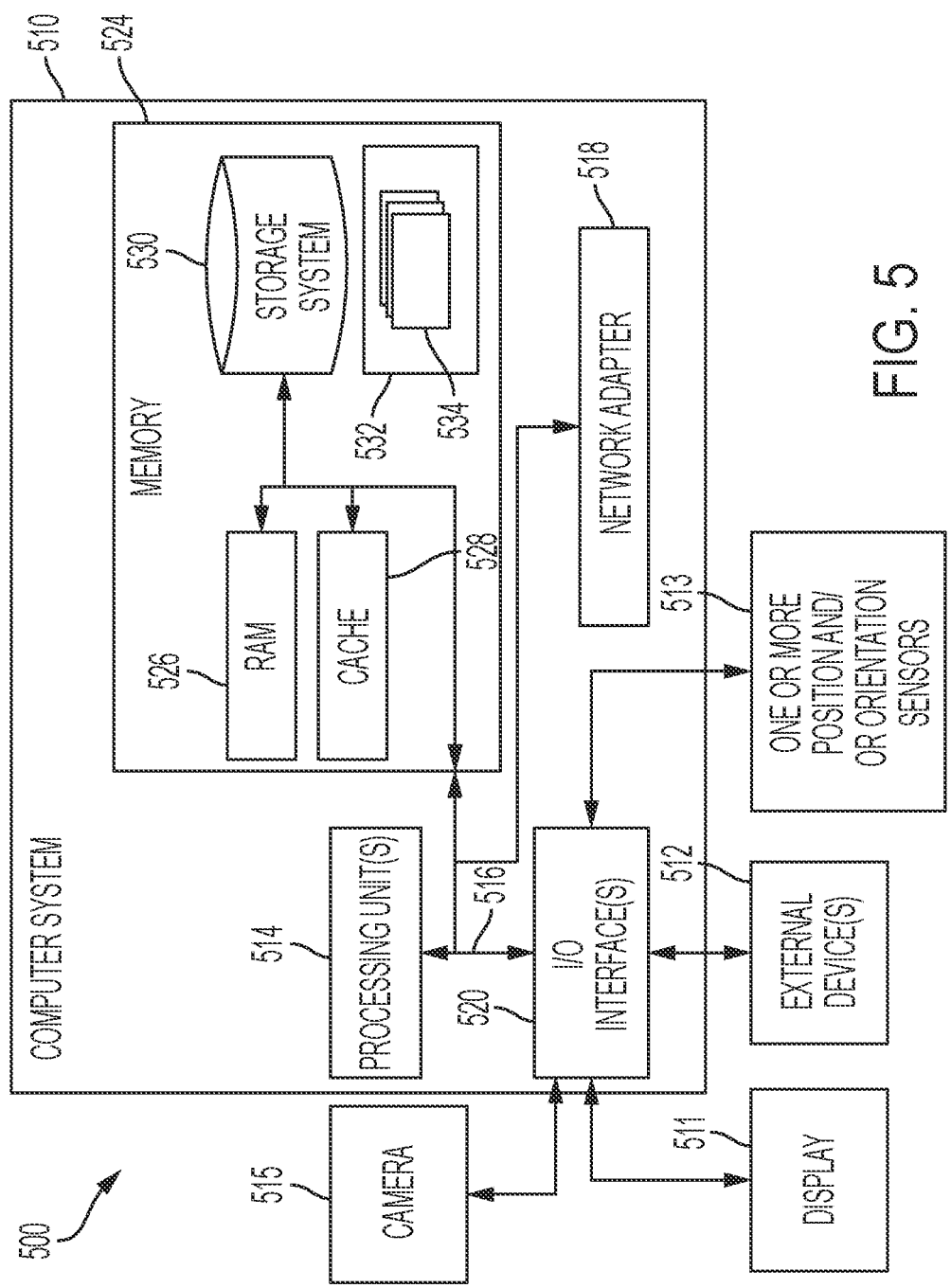
FIG. 5 is a block diagram depicting components (such as the server of FIG. 1) of a data processing system.

FIG. 5 is a block diagram depicting components (such as the server 104 of FIG. 1) of a data processing system. FIG. 5 is a block diagram, generally designated 500, depicting components of computing device capable of operating the authentication program 110 in accordance with embodiments of the present disclosure. FIG. 5 provides only an illustration of one implementation and does not imply any limitations with regard to the environments in that different embodiments may be implemented. Many modifications to the depicted environment may be made.

In one or more cases, the server 104 in the data processing environment 100 is shown in the form of a general-purpose computing device, such as computer system 510. The components of the computer system 510 may include, but are not limited to, one or more processors or processing unit 514, a memory 524, and a bus 516 that couples various system components including the memory 524 to the processing unit 514.

The bus 516 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

The computer system 510 typically includes a variety of computer system readable media. Such media may be any available media that is accessible by the computer system 510, and it includes both volatile and non-volatile media, removable and non-removable media.

The memory 524 can include computer system readable media in the form of volatile memory, such as random access memory (RAM) 526 and/or cache memory 528. The computer system 510 may further include other removable/non-removable, volatile/non-volatile computer system storage media. By way of example only, the storage system 530 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to the bus 516 by one or more data media interfaces. As will be further depicted and described below, the memory 524 may include at least one computer program product having a set (e.g., at least one) of program modules that are configured to carry out the functions of embodiments.

A program/utility 532, having one or more sets of program modules 534, may be stored in the memory 524 by way of example, and not limitation, as well as an operating system, one or more application programs, other program modules, and program data. Each of the operating systems, one or more application programs, other program modules, and program data, or some combination thereof, may include an implementation of a networking environment. The program modules 534 generally carry out the functions and/or methodologies of embodiments as described herein. The computer system 510 may also communicate with one or more external device(s) 512 such as a keyboard, a pointing device, a display 511, etc., or one or more devices that enable a user to interact with the computer system 510 and any devices (e.g., network card, modem, etc.) that enable the computer system 510 to communicate with one or more other computing devices. Such communication can occur via Input/Output (I/O) interface(s) 520. Still yet, the computer system 510 can communicate with one or more networks such as a local area network (LAN), a general wide area network (WAN), and/or a public network (e.g., the Internet) via a network adapter 518. As depicted, the network adapter 518 communicates with the other components of the computer system 510 via the bus 516. It should be understood that although not shown, other hardware and software components, such as microcode, device drivers, redundant processing units, external disk drive arrays, RAID systems, tape drives, and data archival storage systems may be used in conjunction with the computer system 510.

The embodiments described in the present disclosure may relate to a system, a method, and/or a computer program product. The computer program product may include a computer readable storage medium (or media) having computer readable program instructions for causing a processor to carry out aspects of the embodiments. When the data processing system includes a client device (such as client devices 106 and 108 of FIG. 1), the system also may include a camera 515, and one or more position and/or orientation sensors 513, such as an accelerometer, gyroscope and/or inertial measurement unit.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions, cloud storage, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a non-transitory computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

The computer readable program instructions for carrying out operations of the embodiments may be instruction-set-architecture (ISA) instructions, machine instructions, machine dependent instructions, microcode, firmware instructions, state-setting data, or either source code or object code written in any combination of one or more programming languages, including an object oriented programming language such as C++ and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In one or more cases, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the embodiments described in the present disclosure.

Aspects of the embodiments are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, can be implemented by non-transitory computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may be executed substantially concurrently, the blocks may sometimes be executed in the reverse order, depending upon the functionality involved, or the blocks may sometimes be executed out of order, depending upon the functionality involved. It will also be noted that each block of the block diagrams and/or flowcharts, and combinations of blocks in the block diagrams and/or flowcharts, can be implemented by special purpose hardware-based systems that perform the specified functions or acts or carry out combinations of special purpose hardware and computer instructions.

The various embodiments described above are provided by way of illustration only and should not be construed to limit the claims attached hereto. It will be appreciated that one or more embodiments of the above-disclosed and other features and functions, or alternatives thereof, may be desirably combined into many other different systems or applications.

The invention claimed is:

1. An authentication method to grant access to a secure service, the authentication method comprising:
   capturing, by a camera of a user device, images of one or more real-world objects in a physical environment;
   displaying, on a display of the user device, the captured images;
   determining that an electronic device is being displayed on the display of the user device, the electronic device providing a secure service, the secure service providing access to one or more functions of a multi-function print device;
   in response to the electronic device being displayed on the display of the user device, displaying a virtual authentication lock on the display of the user device;
   receiving one or more interactions with the virtual authentication lock;
   determining whether the one or more interactions correspond to one or more authentication interactions related to the virtual authentication lock; and
   granting, in response to the one or more interactions corresponding to the one or more authentication interactions, access to the secure service provided by the electronic device.

2. The authentication method of claim 1, wherein the electronic device is the multi-function print device.

3. The authentication method of claim 1, wherein determining that the electronic device is being displayed on the display of the user device comprises using a neural network trained to detect the electronic device.

4. The authentication method of claim 1, wherein displaying the virtual authentication lock on the display of the user device comprises displaying the virtual authentication lock near the electronic device.

5. The authentication method of claim 1, wherein the one or more interactions comprise one or more gestures.

6. An authentication method to grant access to a secure service, the authentication method comprising:
   capturing, by a camera of a user device, images of one or more real-world objects in a physical environment;

displaying, on a display of the user device, the captured images;

determining that an electronic device is being displayed on the display of the user device, the electronic device providing a secure service, the secure service providing access to one or more functions of a multi-function print device;

in response to the electronic device being displayed on the display of the user device, displaying a virtual authentication lock on the display of the user device;

receiving one or more interactions with the virtual authentication lock;

determining whether the one or more interactions correspond to one or more authentication interactions related to the virtual authentication lock;

when the one or more interactions correspond to the one or more authentication interactions, granting access to the secure service provided by the electronic device; and when the one or more interactions do not corresponding to the one or more authentication interactions, displaying one or more other virtual authentication locks.

7. A computer program product for determining whether to grant access to a secure service, the computer program product comprising:

a non-transitory computer-readable storage medium having program instructions embodied therewith for determining whether to grant access to a secure service, the secure service providing access to one or more functions of a multi-function print device, the program instructions executable by one or more processors, the program instructions comprising:

capturing, by a camera of a user device, images of one or more real-world objects in a physical environment;

displaying, on a display of the user device, the captured images;

determining that an electronic device is being displayed on the display of the user device, the electronic device providing a secure service;

in response to the electronic device being displayed on the display of the user device, displaying a virtual authentication lock on the display of the user device;

receiving one or more interactions with the virtual authentication lock;

determining whether the one or more interactions correspond to one or more authentication interactions related to the virtual authentication lock; and granting, in response to the one or more interactions corresponding to the one or more authentication interactions, access to the secure service provided by the electronic device.

8. The computer program product of claim 7, wherein the electronic device is the multi-function print device.

9. The computer program product of claim 7, wherein determining that the electronic device is being displayed on the display of the user device comprises using a neural network trained to detect the electronic device.

10. The computer program product of claim 7, wherein displaying the virtual authentication lock on the display of the user device comprises displaying the virtual authentication lock near the electronic device.

11. The computer program product of claim 7, wherein the one or more interactions comprise one or more gestures.

\* \* \* \* \*